Feb. 5, 1929.

H. C. HARRIS 1,701,474

BEARING

Filed Dec. 1, 1924

Inventor
H. C. Harris
By
Attorney

Feb. 5, 1929.
H. C. HARRIS
1,701,474
BEARING
Filed Dec. 1, 1924    2 Sheets-Sheet 2
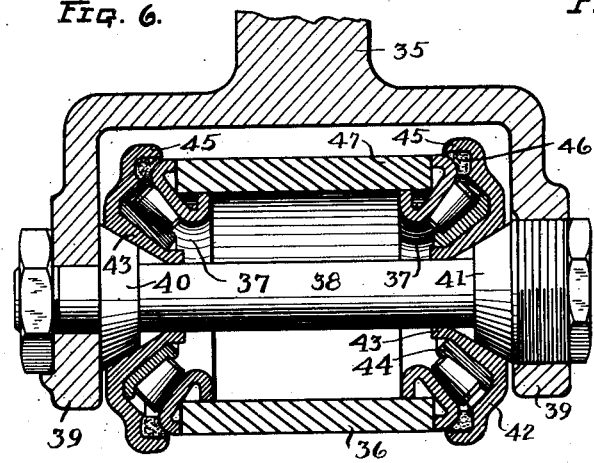
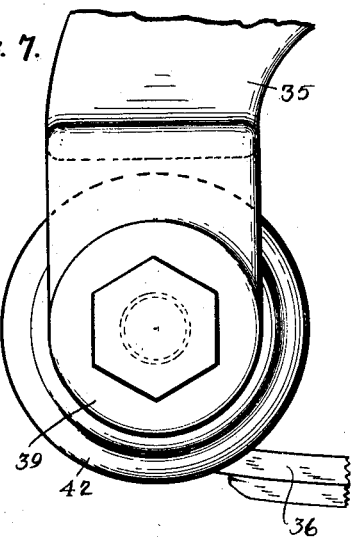
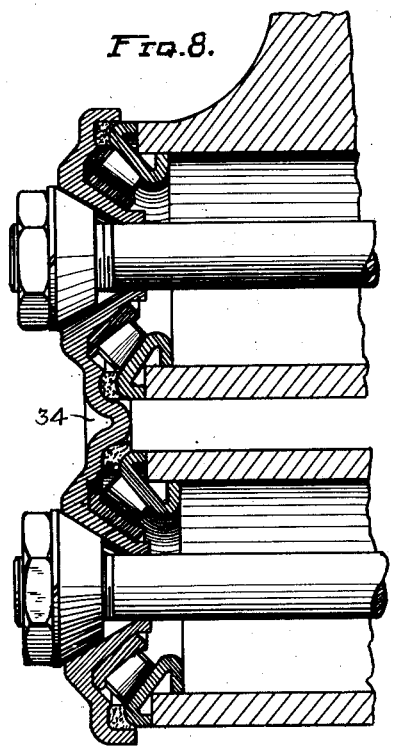
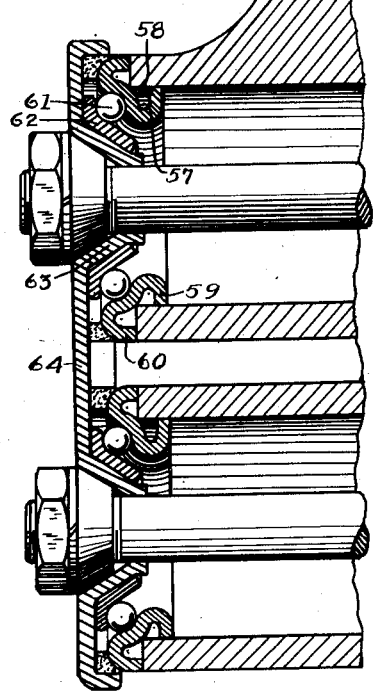
Inventor
H. C. HARRIS
By
Attorney Patented Feb. 5, 1929.

1,701,474

UNITED STATES PATENT OFFICE.

HOWARD C. HARRIS, OF AKRON, OHIO, ASSIGNOR TO THE FAFNIR BEARING COMPANY, OF NEW BRITAIN, CONNECTICUT, A CORPORATION OF CONNECTICUT.

BEARING.

Application filed December 1, 1924. Serial No. 753,197.

This invention relates particularly to improvements in connections between the springs and frame of a motor vehicle.

It is one of the objects of the invention to provide a pivotal connection between a spring eye and the vehicle frame, including antifriction bearings, that will compare favorably, as to cost, with the ordinary pivotal connection and yet have all of the advantages of a roller bearing pivot in respect to the matters of flexibility, easy-riding, absence of rattling and minimizing spring breakage.

The invention is an improvement over the Harris Patent 1,474,361, granted November 20, 1923.

In the accompanyng drawings, I have illustrated several applications of my invention. In these drawings:

Fig. 6 is a transverse section through the pivotal connection between the spring eye and the vehicle frame, this being the type of construction that would be used at the end of the frame;

Fig. 7 is a side elevation thereof;

Fig. 8 is a view similar to Fig. 3 but showing a further modification; and

Fig. 9 is a view similar to Fig. 4 but showing a modification of the race members.

Figure 1:
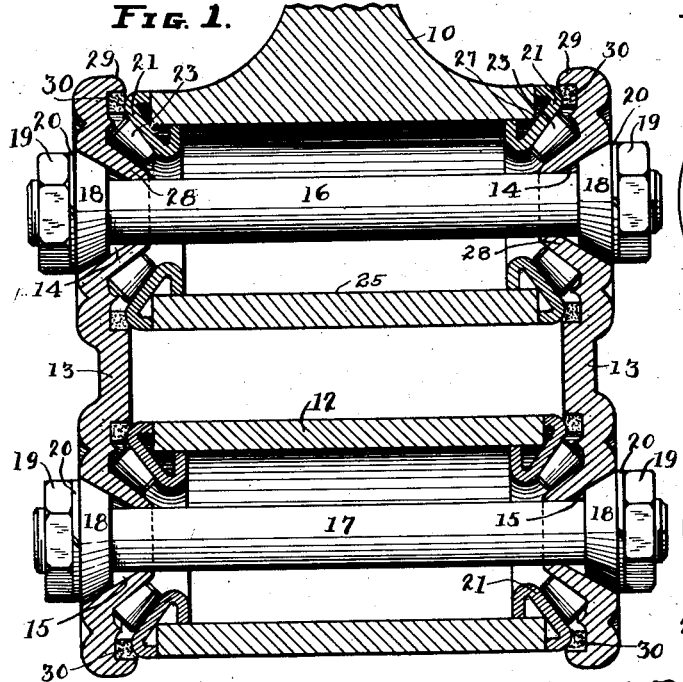
Figure 1 is a transverse section through a shackle connecting the spring eye with the vehicle frame.
Figure 2:
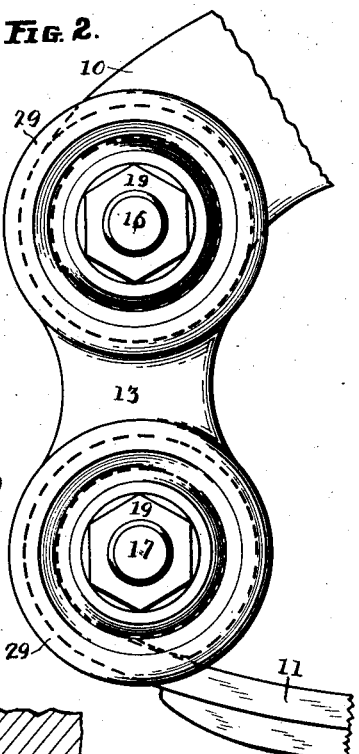
Fig. 2 is a side elevation thereof.

Referring to Figs. 1 and 2, 10 indicates the frame member of a vehicle, and more particularly the rear end which is usually connected with the rear spring by means of shackles for the purpose of accommodating the lengthening and shortening of the spring as it deflects. One end of the spring is indicated at 11 and it has the usual eye 12 formed thereon. A pair of shackle links 13, preferably formed by stamping operations from sheet metal have the conical depressions 14 and 15, the bottoms of which are perforated to receive the bolts 16 and 17, respectively. These bolts carry, adjacent their ends, the washers 18 which have conical outer faces fitting the depressions 14 and 15. The ends of the bolts 16 and 17 are threaded and provided with nuts 19 and lock washers 20 by which the parts are secured together as shown in the drawings.

The outer race members 21 of tapered roller bearings are fitted in the ends of the eye of the frame member 10. Each of these race members is stamped from sheet metal and comprises a conical portion 22 which is engaged by the rollers 23, and a radially extending flange 24, the periphery of which fits the bore or eye in the frame member. The race member 21 also has an axially extending flange 26, directed toward the plane of the flange 24 and adapted to abut against the end of the eye in the frame 10, as will be clearly seen in Fig. 1. The race member 21 is preferably so formed that the outer side of the conical portion 22, between the flanges 24 and 26, engages with the corner 27 at the end of the bore 25 so as to reinforce the race member at this point which, as will be seen from Fig. 1, is directly opposite the middle plane of the rollers 23.

The rollers 23 engage with the outer surface of the inwardly directed flanges 28 forming the depressed portions 14, 15 of the shackle members 13 so that these portions constitute the inner race members of the bearings. The shackle members are provided with axially extending flanges 29, of circular form, which project toward the outer race members 21 and cooperate therewith to exclude dust, felt rings 30 being provided to fill the opening between these members, these felt rings being retained by the flanges 29. The connection between the spring eye 12 and the shackle members 13 is, in the form illustrated in Fig. 1, similar to that described above so that this connection will be clear from the drawing, without further description.

Figure 3:
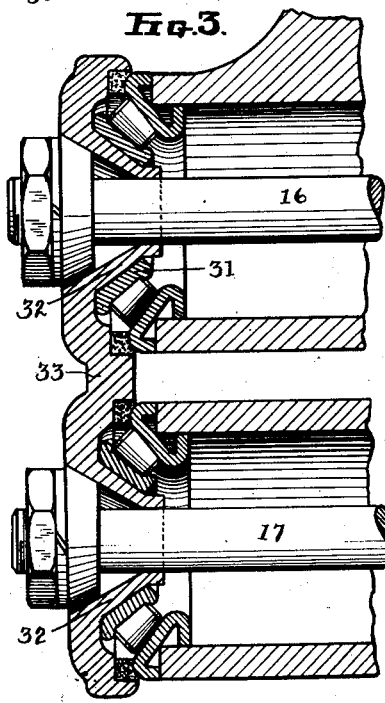
Fig. 3 is a fragmentary view similar to Fig. 1 but showing a modification thereof.

In the form of the invention illustrated in Fig. 3 the general construction is the same as that illustrated in Fig. 1 but there is a separate inner race ring 31 mounted on the conical projecting portion 32 of the shackle member 33 so that this inner race member may be considered as made in two parts, one being the projecting portion 32 of the shackle and the other being the conical ring 31.

In the form of the invention illustrated in Fig. 8 the construction is similar to that of Fig. 3 with the exception that the shackle member 34 is so formed as to be of substantially uniform thickness throughout its various portions.

In Fig. 6 I have illustrated the connection between the front end or horn 35 of the frame member, and the spring eye 36. In this form of connection there are race members 37 at the ends of the eye, that are, in all respects, similar to the race members 21. A bolt 38 extends through the spring eye, on the axis thereof, and is mounted in arms 39—39 of the yoke member on the horn 35. There are conical members 40 and 41 on the bolt 38, on the inner sides of the yoke members 39. A pressed metal cap 42 has a central conical projection 43 on which is mounted the conical inner bearing ring 44, the depressed portion formed by the flange 43 fitting the conical member 41. The cap 42 has an axially extending flange 45 which serves to retain a felt dust-excluding ring 46. The tapered rollers 47 are arranged between the ring 44 and the outer race member 37.

The form shown in Figs. 6 and 7 is more fully described and claimed in a divisional application, Ser. No. 52,747, filed Aug. 27, 1925.

Figure 4:
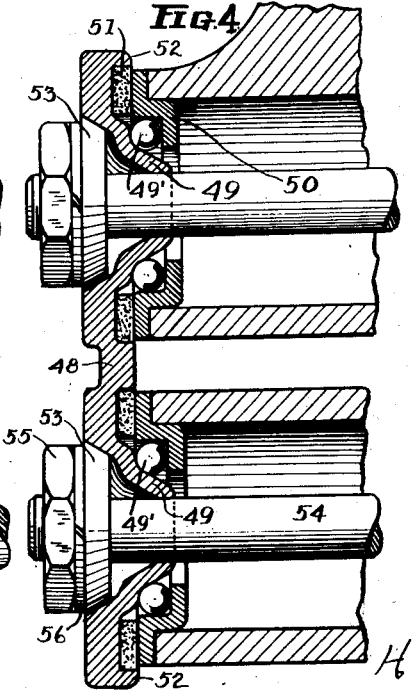
Fig. 4 is a view similar to Fig. 3 but illustrating the use of ball bearings in the application of my invention.
Figure 5:
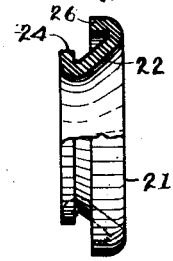
Fig. 5 is a composite view, partly in elevation and partly in section, of one of the race members of the roller bearings illustrated in Figs. 1 and 3.

In the form of the invention illustrated in Fig. 4 the shackle member 48 is formed of pressed metal and has the conical projecting portions 49 which act as the inner race members for the balls 49'. The outer race members 50 are formed of pressed metal, and dust-excluding felt washers 51 are arranged between the members 50 and the shackle member 48 and retained by means of the axially extending flanges 52. A conical washer 53 on the bolt 54, fits the interior or depressed seat formed by the projecting portion 49 of the shackle member, and a nut 55 and lock washer 56 secure the washer 53 in position.

The form of the invention illustrated in Fig. 9 shows the application of ball bearings to the type of shackle and race members illustrated in Fig. 8. In this case the outer race member 57 is formed of pressed metal but the portion 58, between the flanges 59 and 60, is formed with a groove to receive the balls 61. The inner race member for the balls 61 comprises the ring 62 and the conical projecting portion 63 of the shackle 64.

From the various illustrations it will be seen that the constructions which I have devised permit of easy lubrication of the bearings because the spring eyes and also the eye 25 of the frame member may be filled with grease. It will also be apparent that the anti-friction bearings will give entire freedom of movement of the parts and that by making the shackle members and bearing race members of pressed metal the various designs may be manufactured at a minimum cost.

By connecting the spring and frame so that the anti-friction bearing members take both radial and thrust loads, there need be no rubbing surfaces to wear and give trouble.

In the claims I have used the term "roller bearings" in the generic sense in which it includes all types of anti-friction rollers and in the drawings I have illustrated rollers of the conical and spherical types although the invention is not limited to these types of rollers.

Having thus described my invention, what I claim is:

1. In a device of the class described, the combination of two members, each having an eye, and means for connecting said members together comprising bolts extending through said eyes, pressed metal shackles connecting said bolts at the opposite ends of said eyes and each having two conical flanges surrounding said bolts and serving as the inner race member of an anti-friction bearing, said shackles having outer depressed seats surrounding said bolts and said bolts having means fitting said seats, and two circular flanges concentric with said conical flanges and extending toward said eyes, outer race members mounted in the outer ends of said eyes, rollers between the cooperating inner and outer race members, and dust-excluding means carried in said circular flanges.

2. In a device of the class described, the combination of two members, each having an eye, and means for connecting said members together comprising bolts extending through said eyes, pressed metal shackles connecting said bolts at the opposite ends of said eyes and each having two conical flanges, surrounding said bolts and serving as the inner race member of an anti-friction bearing, each of said race members including a replaceable wear ring, said shackles having outer depressed seats surrounding said bolts and said bolts having means fitting said seats, said shackles also having two circular flanges each of which extends toward said eyes, outer race members mounted in the outer ends of said eyes, rollers between the cooperating inner and outer race members, and dust-excluding means carried in said circular flanges.

3. As a new article of manufacture, a race member for an anti-friction bearing formed of pressed metal and having a radially extending flange at one end, an axially extending flange at the other end turned toward the plane of said radial flange and a conical portion between and connecting said flanges.

4. In a device for connecting a vehicle frame and spring, a pair of sheet metal members forming supporting seats for anti-friction bearing members, a bolt extending through said sheet metal members, means carried by said bolt for adjusting said members toward each other, a second pair of sheet metal members forming seats complementary to the first-mentioned bearing seats, said second pair of sheet metal members each having a radially extending portion and an axially extending portion, said second pair of sheet metal members engaging in an eye on one of the members to be connected together, one of said extending portion engaging the edge of the eye and the other of said extending portion engaging the inner circumference of the eye, whereby the members are positioned both radially and axially thereon, and anti-friction bearing members interposed between the complementary bearing seats.

5. In a device for connecting a vehicle frame and spring, each having an eye thereon, seats for anti-friction bearing members at each end of each eye, shackle plates arranged at opposite sides of said eyes, said plates being formed of sheet metal and each having two inwardly directed portions leaving a generally conical-shaped recess in the outside thereof, anti-friction bearing members interposed between said inwardly directed portions and said bearing seats carried by said eyes, and bolts extending through said eyes and through said shackle plates at the inwardly directed portions, said bolts having means thereon fitting in said generally conical shaped recesses in said shackle plates.

6. As an article of manufacture, a shackle link having a pair of inwardly directed portions to form supports for anti-friction bearing members, said inwardly directed portions leaving a generally conical shaped recess on the outside of said shackle link at opposite ends thereof for forming a receiving seat for a bolt head.

7. In a device for connecting a vehicle frame and spring, each having an eye thereon, a shackle plate at each side of said eyes for connecting said spring and frame to each other, seats for anti-friction bearing members on said eyes at opposite sides thereof, said shackle links having apertures therethrough substantially concentric with the eyes in said spring and frame, inwardly directed portions concentric with said apertures, said inwardly directed portions leaving a generally conical shaped recess in the outside of each link at each end thereof, bolts passing through said apertures and through said eyes, means on said bolts and substantially fitting in said substantially conical shaped recesses in the outside of said shackle links, means for moving said means on said bolts for adjusting said shackle links toward each other, and anti-friction bearing members interposed between the seats on said eyes and said inwardly directed portions.

8. In the combination defined in claim 7, said shackle links having peripheral flanges extending toward said eyes, and dust-excluding means positioned by said flanges and substantially closing the space between said shackle links and said eyes.

9. In a device for connecting a vehicle frame and spring, one of which has an eye therein, side members, a bolt extending between said side members, anti-friction bearing member seats on said side members, anti-friction bearing member seats for said eye, said seats including a member having an axially extending portion and a radially extending portion, one of which portions fits the inner circumference of said eye and the other of which portions abuts against the edge of said eye.

10. As an article of manufacture, a shackle link formed of sheet metal having a depressed seat at one side, and a projecting seat at the opposite side.

In testimony whereof I affix my signature.

HOWARD C. HARRIS.